Sept. 11, 1934. A. BOHNENBLUST Re. 19,310

PUMP

Original Filed June 2, 1930 2 Sheets-Sheet 1

Inventor:
Arnold Bohnenblust
By Flournoy Corey Atty.

PUMP

Original Filed June 2, 1930 2 Sheets-Sheet 2

Inventor:
Arnold Bohnenblust
By Flournoy Corey.
Atty.

Reissued Sept. 11, 1934

Re. 19,310

UNITED STATES PATENT OFFICE 19,310

PUMP

Arnold Bohnenblust, Riley, Kans.

Original No. 1,860,768, dated May 31, 1932, Serial No. 458,959, June 2, 1930. Application for reissue August 29, 1933, Serial No. 687,369

4 Claims. (Cl. 103—171)

This invention aims to provide a simple form of pump, which is efficient in operation, novel means being provided for returning to the inlet of the pump water which may work past the pistons of the pump.

It is within the province of the disclosure to provide a compact article of the class described which will withstand hard usage and require but little expert attention.

The invention aims to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:—

Figure 1:
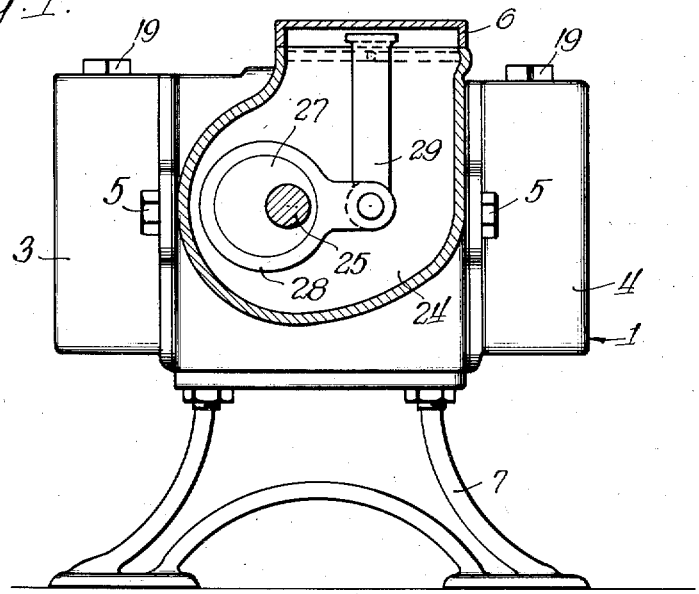
Figure 1 shows in section, a device constructed in accordance with the invention.

In carrying out the invention, there is provided a casing, denoted generally by the numeral 1. The casing 1 is a composite structure including a central portion or body 2 and valve casings 3 and 4 secured at 5 to opposite ends of the body 2. A lid 6 is secured on the body 2. The casing 1 may be supported on a pedestal 7 connected to the body 2. There is a chamber 8 in the valve housing 3, and the valve housing 4 is supplied with a chamber 9. A lower passage 10 is formed in the body 1 and in the valve housings 3 and 4. The lower passage 10 has an inlet 11. An upper passage 12 is formed in the valve housings 3 and 4 and in the body 2. The lower passage 10 is located in the longitudinal center of the casing 1.

Figure 2:
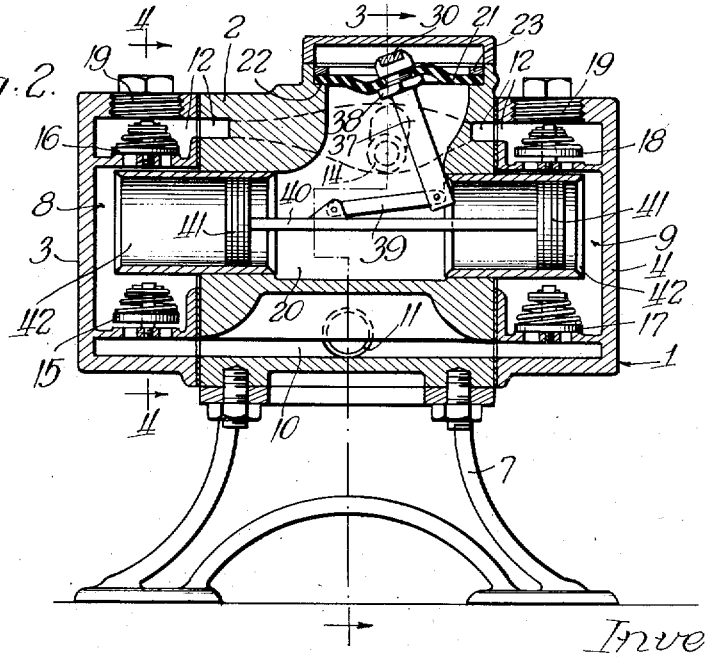
Figure 2 is a section taken longitudinally of the pump, the cutting plane in Figure 2 being remote from the cutting plane in Figure 1.
Figure 3:
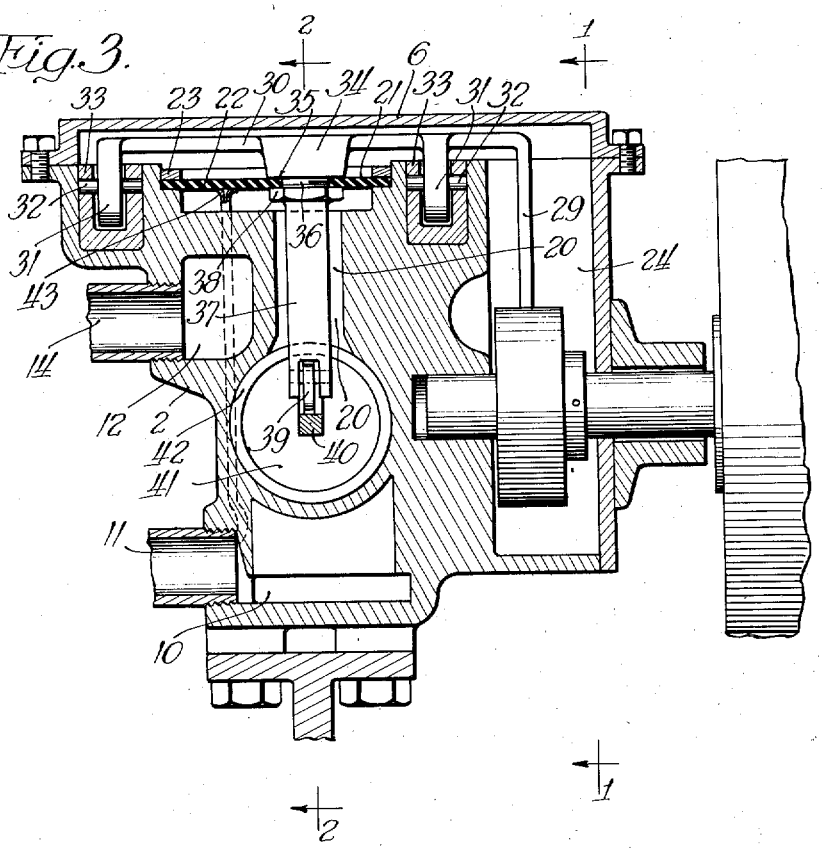
Figure 3 is a transverse section taken through the main part of the pump.
Figure 4:
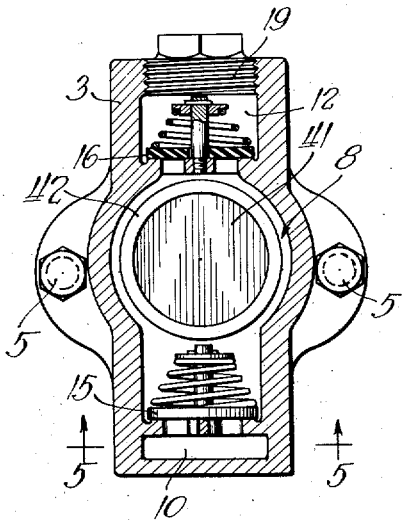
Figure 4 is a transverse section taken through one of the valve housings.
Figure 5:
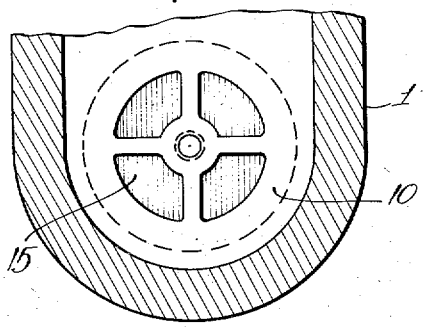
Figure 5 is a detailed view of a valve and valve port taken from below.

The central portion of the upper passage 12 is offset to one side of the median longitudinal plane of the casing 1, as will be understood readily when Figures 2 and 3 are compared. Intermediate its ends, the upper passage 12 is supplied with an outlet 14 located in the body 2.

The housing 3 carries a spring-operated valve 15 which closes toward the passage 10, and governs the backflow from the chamber 8 into the passage 10. The valve housing 3 carries a valve 16 which closes toward the chamber 8 and governs the backflow from the upper passage 12 into the chamber 8. The valve housing 4 carries a spring-operated valve 17 which closes toward the lower passage 10 and governs the back flow from the chamber 9 into the passage 10. The valve housing 4 carries a valve 18 which closes toward the chamber 9 and governs the back flow from the upper passage 12 to the chamber 9.

Removable plugs 19 may be mounted in the upper ends of the valve housings 3 and 4 to give access to the chambers 8 and 9.

The casing 1 has a central compartment 20 located in the body 2 and extended upwardly into the lid 6. The compartment 20 is contracted in width, as shown in Figure 3, in its middle portion, the compartment extending into the upper part of the body 2 and being of considerable width within the lid 6. Across the compartment 2 extends a flexible diaphragm 21 which may be made of a rubber compound or any other suitable material. The flexible diaphragm 21 rests on a shoulder 22 in the body 2 and is held on the shoulder 22 by a removable frame 23 secured to the shoulder and located above the diaphragm 21.

The casing 1 has a side chamber 24 located in the central body 2 of the pump. A drive shaft 25 is journaled for rotation in the body 2 and extends across the chamber 24. The shaft 25 may be rotated in any desired way, for instance, by means of an external wheel 26. An eccentric 27 is secured to the drive shaft 25 and is located in the side chamber 24. Around the eccentric 27 extends a strap 28 pivoted to a depending arm 29 on one end of a shaft 30 having depending fingers 31 mounted to swing on pin shafts 32 carried by bearings 33 located in the body 2, the shaft 30 being disposed in the extreme upper part of the chamber 20. Intermediate its ends, the shaft 30 is supplied with a depending boss 34 defining a shoulder 35 from which projects a threaded stem 36 carrying an arm 37.

The stem 36 extends through the flexible diaphragm 21. The diaphragm 21 abuts against the shoulder 35 and is held in abutment with the shoulder by a nut 38 pivoted on the stem 36. The lower end of the arm 37 is pivoted to a pitman 39. The pitman, in its turn, is pivoted to a rod 40 forming a connection between pistons 41 mounted to reciprocate in cylinders 42 carried by the body 2 and extended into the chambers 8 and 9. A tube 43 is mounted in the body 2 and forms a duct that communicates at its lower end with the passage 10. The upper end of the tube 43 is located immediately under the flexible diaphragm 21 and ordinarily is closed by the said diaphragm. Among other functions, the diaphragm 21 takes the place of stuffing boxes and glands usually found in an analogous place in similar force pumps.

In practical operation, the shaft 25 is rotated by the wheel 26 and the eccentric 27, cooperating with the strap 28, imparts swinging movement to the shaft 30 by way of the arm 29. When the shaft 30 is rocked, the arm 37 cooperates with the pitman 39 and the rod 40 to move the pistons 41 in opposite directions. The water enters the lower passage 10 by way of the inlet 11 and is sucked past the valves 15 and 17 by the action of the pistons 41. When the direction of movement of the pistons 41 is reversed, the valves 15 and 17 close, and the valves 16 and 18 open, the water entering the upper passage 12, and leaving by the outlet 14, the pump being a double acting pump in operation.

The purpose of the flexible diaphragm 21 is to prevent the water from working into the side chamber 24, and it supplants stuffing boxes and glands, as hereinbefore mentioned. The diaphragm 21, moreover, when the pump is not in operation, prevents back pressure in the inlet from passing the piston and leaking away, as would be the case if glands or packings entered into the construction. The diaphragm also regulates the height of the water in the compartment 20 and keeps the pump primed at all times. The diaphragm 21 can raise when enough water has leaked past the pistons 41 into the compartment 20, and when diaphragm 21 raises, the upper end of the tube or duct 43 is uncovered, and the water is sucked back into the lower passage 10 until the flexible diaphragm 21 closes down again on the upper end of the tube or duct 43, due to the formation of a partial vacuum.

In operation the weight of the diaphragm, its position, and the vacuum or suction created in the duct 43 by the inlet suction ordinarily combine to keep the inlet to the duct closed, but when sufficient water accumulates in the compartment 20 it will fill the compartment and raise the diaphragm. The excess water is sucked through the duct and the inlet to the duct is again closed by the diaphragm. Of course movement of the diaphragm in operation may at times momentarily open the duct but this action only assists in keeping excess water out of the compartment 20.

Having thus described the invention, what is claimed is:—

1. A pump comprising a casing and a cylinder carried thereby, the casing having a compartment communicating with one end of the cylinder, a piston slidable in the cylinder, a flexible diaphragm carried by the casing and extended across the compartment, an arm passing through the diaphragm and hermetically mounted therein, means in the compartment, on one side of the diaphragm, for connecting the arm to the piston, means in the compartment, on the opposite side of the diaphragm, for operating the arm, the casing being provided with a duct for conducting away liquid which leaks past the piston into the compartment on the first-specified side of the diaphragm, the intake end of the duct being closed by the diaphragm in the normal operation of the pump, the diaphragm yielding under piston pressure, when the compartment is full of liquid on the first-specified side of the diaphragm, to space the diaphragm from the intake end of the duct and permit liquid which has leaked past the piston to flow away through the duct.

2. In a pump of the class described, a casing, a shaft extending over the top of the casing for actuating the pump, a pair of blocks located in the casing at the upper face thereof having pockets therein, the shaft having depending fingers extending into these pockets and pins in the pockets for pivotally securing the fingers to the bearings, a downwardly-depending boss at the middle portion of the shaft, means attached to the boss for actuating the piston of the pump and a downwardly depending arm at one end of the shaft for oscillating the shaft.

3. In a pump of the class described, a casing having a chamber in which a piston reciprocating mechanism is located, the piston reciprocating mechanism, means for actuating the piston reciprocating mechanism, a flexible diaphragm between the piston reciprocating mechanism and the actuating means to seal off one from the other, and means for draining fluid out of the chamber when it reaches the diaphragm and lifts it comprising a duct having one open end terminating beneath and against the lower surface of the diaphragm, and having its other end connected to the intake manifold of the pump.

4. A pump, comprising a reciprocable piston, a compartment therefor, and having an inlet passage associated therewith, an operating arm connected to said piston and extending above said piston, an oscillating mechanism located at one side of said piston and outside of said piston housing, an arm connecting said oscillating mechanism and said piston operating arm, a diaphragm for sealing said piston compartment at a point above said piston, means adapted to drain a portion of fluid from said piston housing into said inlet passage comprising a tube connected to the inlet passage and having its inlet opening just beneath the diaphragm whereby ordinarily the weight of the diaphragm and suction of the tube on the diaphragm keeps the inlet closed but when fluid fills the piston housing the fluid raises the diaphragm and permits the inlet suction to draw off the excess fluid.

ARNOLD BOHNENBLUST.